(12) United States Patent
Bruchmann

(10) Patent No.: US 9,373,946 B2
(45) Date of Patent: Jun. 21, 2016

(54) BUSBAR ADAPTER

(71) Applicant: Klaus Bruchmann GmbH, Weisskirchen an der Traun (AT)

(72) Inventor: Klaus Bruchmann, Coburg (DE)

(73) Assignee: Klaus Bruchmann GmbH, Weisskirchen an der Traun (AT)

( * ) Notice: Subject to any disclaimer, the term of this patent is extended or adjusted under 35 U.S.C. 154(b) by 66 days.

(21) Appl. No.: 14/500,214

(22) Filed: Sep. 29, 2014

(65) Prior Publication Data

US 2015/0090493 A1    Apr. 2, 2015

(30) Foreign Application Priority Data

Sep. 30, 2013  (DE) .......................... 10 2013 110 788

(51) Int. Cl.
*H02G 5/00*    (2006.01)
*H02B 1/21*    (2006.01)

(52) U.S. Cl.
CPC ... *H02G 5/00* (2013.01); *H02B 1/21* (2013.01)

(58) Field of Classification Search
CPC .................................. H02G 5/00; H02B 1/21
USPC ................................................ 174/88 B, 659
See application file for complete search history.

(56) References Cited

U.S. PATENT DOCUMENTS

| | | | | |
|---|---|---|---|---|
| 3,049,801 A * | 8/1962 | Workman | ................ | H02G 5/06 156/285 |
| 3,746,936 A * | 7/1973 | Coffey | ................ | H02B 1/03 174/549 |
| 5,938,461 A * | 8/1999 | Biermeier | ................ | H02G 5/06 439/212 |
| 7,520,776 B2 * | 4/2009 | Wagener | ................ | H02B 1/21 439/532 |
| 2008/0002338 A1 | 1/2008 | Wagener | | |

FOREIGN PATENT DOCUMENTS

DE    10061940 A1    7/2002
EP    0 642 197 A1   3/1995

* cited by examiner

*Primary Examiner* — Timothy Thompson
*Assistant Examiner* — Charles Pizzuto
(74) *Attorney, Agent, or Firm* — Wood, Phillips, Katz, Clark & Mortimer

(57) ABSTRACT

The present invention relates to a busbar adapter having a lower deck and an upper deck that can be interconnected releasably. The deck elements comprise projections and openings that can be brought into engagement with each other, the busbar adapter further comprises a locking device.

14 Claims, 9 Drawing Sheets

BUSBAR ADAPTER

FIELD OF THE INVENTION

The present invention relates to a busbar adapter by means of which electrical appliances, in particular electrical installation appliances, are fastened to a busbar system. Such busbar adapters are in particular suitable for electrical busbar systems, in particular 3-phase busbar systems and in particular for fastening fuse systems, switch-fuse units etc., but also for all other electrical installation appliances.

BACKGROUND OF THE INVENTION

The prior art discloses busbar adapters that are manufactured from a plurality of individual units and are assembled prior to dispatch. Such appliances can comprise for example a base that can be fastened to the busbar system and a top to which electrical devices are fastened. Such a busbar adapter is known for example from EP 0 642 197 A1, adapter base and adapter top being interconnected by means of a multiplicity of supporting webs running in the longitudinal direction of the adapter base on the one hand and a multiplicity of supporting lugs arranged at the appropriate locations of the adapter top, lateral connecting elements being additionally provided that are connected both to the adapter top and also to the adapter base and enclose both now fully assembled parts. The fully assembled adapter is then handed over to the user, separation of the individual components by the user not being intended.

An object of the present invention is to provide a busbar adapter that can be operated particularly simply and that indicates its present operating state in a particularly simple and clear manner and where incorrect operation is avoided.

BRIEF SUMMARY OF THE INVENTION

The object is achieved by a busbar adapter according to Claim 1, Claims 2 to 11 relate particularly preferable embodiments of the inventive busbar adapter.

According to the invention, the busbar adapter comprises a lower-deck element that on its lower side comprises at least one fastening element for fastening the busbar adapter to one or more busbars. The inventive busbar adapter also comprises an upper-deck element for placing thereon and fastening electrical installation appliances, the upper-deck element being releasably connected to the lower-deck element.

According to the invention, one of the deck elements (first deck element), either the upper-deck element or the lower-deck element, comprises on each side, preferably on one side terminating the element in the longitudinal direction, an end wall having in each case at least one opening. The other deck element (second deck element) comprises according to the invention on each side, preferably on one side terminating the element in the longitudinal direction, likewise an end wall having in each case at least one projection, the projections of the other (second) deck element all preferably extending in the same direction. The longitudinal axis of the lower-deck and of the upper-deck element preferably extends at right angles to the longitudinal extent of the busbars.

In a particularly preferred embodiment, the end walls are in each case situated at the longitudinal ends of the lower-deck element or of the upper-deck element. However, it is also possible that the end walls are not located on one side of the lower-deck or of the upper-deck element that terminate the respective element in the longitudinal direction, but that at least one of the end walls is situated at a distance from the longitudinal ends, i.e. in the longitudinal direction between the longitudinal ends of the deck elements.

According to the invention, the lower-deck element and the upper-deck element are designed such that the upper-deck element can be placed on the lower-deck element in a motion direction relative to the lower-deck element so that it can be brought into an operating position, this relative motion direction comprising at least one motion component parallel or anti-parallel to the longitudinal axis of the lower-deck element.

According to the invention, the projections of a (first) deck element extend in an operating position of the busbar adapter at least partly into associated openings of the other (second) deck element.

The busbar adapter further comprises a locking device that in its locking position prevents the upper-deck element from shifting relative to the lower-deck element.

Such a busbar adapter exhibits the advantage that it is very easy to place the upper-deck element on the lower-deck element, in particular because the interlocking elements, i.e. the projections in the one (first) deck element and the openings in the other (second) deck element that are arranged at the front sides, are clearly visible to the user, even while the upper-deck element is placed on and fastened to the lower-deck element. This is supported by the fact that the corresponding busbar adapters are usually installed such that at least one front side is installed facing the user. This holds in particular for front sides that are arranged at the longitudinal ends, but also for front sides that are arranged somewhat remote from the longitudinal ends, displaced inward in the longitudinal direction.

Here it is particularly preferable that the interlocking of the projections of the one (first) deck element and the openings in the other (second) deck element are visible to the user even during insertion, preferably at least for one of the end walls, since the corresponding elements are visible to the user even during the process of fastening the upper-deck element to the lower-deck element and are not covered by the upper-deck element.

A further possible advantage consists in the fact that the user can check also visually whether the upper-deck element is securely fastened to the lower-deck element in an operating state, since even in an operating state of the busbar adapter he can see preferably at least at one location whether the projections of the one (first) deck element engage the opening of the other (second) deck element.

Since the corresponding projections and openings on the upper-deck element and on the lower-deck element are present also on the respective front sides, secure and reliable fastening of the two elements is guaranteed, despite only very few fastening elements being provided and in particular additional fastening elements can be dispensed with over the longitudinal extent of the upper-deck element and of the lower-deck element.

The visibility of the projections and/or the openings on the upper-deck element and the lower-deck element also makes it possible for user to see at any time whether the respective elements are flush with each other and therefore the deck elements can be brought into an operating position. In the devices known in the prior art, where at least a multiplicity or all fastening elements are invisible, there is however the risk in those cases where the deck elements cannot be brought easily into an operating position that the user applies increased force which possibly leads to latching, fastening or connecting elements being destroyed.

In a particularly preferred embodiment, the one (first) deck element in each case comprises two openings in each end wall, while the other (second) deck element in each case comprises two projections on each end wall. The advantage of this is that in the case of a very low number of projections or openings still an absolutely safe relative positioning of both deck elements is guaranteed. On account of the low number of fastening or connecting elements, the user can insert very clearly so that incorrect operation is avoided, at the same time weight is saved without penalties having to be tolerated in view of safe positioning of the two deck elements relative to each other.

In another embodiment, at least one projection on and end wall on the one (first) deck element consists of two or even more part projections, recesses being provided in between. This saves more weight without limiting the good visibility of the projection for the user or safe positioning.

In another embodiment, at least one projection on a front side is of annular or part-annular design. This, too, provides for good visibility in conjunction with a low weight, without penalties having to be tolerated in view of the stability or the precision of the positioning of the two deck elements relative to each other.

In a particularly preferred embodiment, at least one projection on a front side of the other (second) deck element is designed such that it protrudes through an associated opening of the one deck element. This guarantees that correct positioning in the operating position can be checked not only optically, but it can also be sensed or felt whether the projection protrudes through a corresponding opening. The at least one projection protrudes preferably 0.5 mm to 2 mm, in particular 1-2 mm, from the opening if the busbar adapter is in its operating position. This enables sufficient check by the user by touching.

In a preferred embodiment, the openings of the one (first) deck element and the projections of another (second) deck element are exclusively provided on the respective end faces of the elements, while no further fastening or latching elements are provided across the longitudinal extent of the two elements.

This guarantees that elements possibly invisible to the user are prevented from not being precisely flush, thus obstructing the insertion, which can also lead to damage to the fastening element. Such an arrangement of fastening elements at the same time enables a thinner design of the deck elements across the longitudinal extent and thus a lower weight. It is also avoided that a multiplicity of elements that are otherwise possibly provided at the bottom of the bar elements are damaged by frequent insertion and frequent removal.

In a preferred embodiment, the busbar adapter also comprises a locking device, preferably having a locking slider and a locking receptacle into which the locking slider engages when it is situated in its locking position and when the upper-deck element and the lower-deck element are in their operating position. Here the locking slider is preferably provided on an end wall of the lower-deck element, while preferably the locking receptacle or the locking receptacles are provided on an end wall of the upper-deck element, in particular on the outer sides of the end walls of the upper-deck element or of the lower-deck element. In this way, very simple and effective locking is made possible, in particular because shifting in a direction parallel (or anti-parallel) to the longitudinal axis and in the direction of a motion out of the operating position is avoided. Obstructing a motion in a direction parallel or anti-parallel to the longitudinal direction of the elements is sufficient because removing the upper-deck element in a direction at right angles to the longitudinal axis is not possible due to the projections engaging the openings.

On top of this, the locking element can be arranged at a visible location on the outside of an end wall of the lower-deck element and/or of the upper-deck element, preferably at a front end, that faces the user in the installed state, which enables the user even better to detect the operating state of the busbar adapter at a glance.

In a further embodiment it is also possible for a latching element to be provided at at least one projection, for example a spring-loaded ball or a spring-loaded pin that takes care that latching-in of the upper-deck element is achieved as soon as the latter is in its operating position on the lower-deck element. Such a spring-loaded ball or a spring-loaded pin are preferably pre-tensioned in a direction pointing radially outward, if essentially circular or annular projections and openings are provided. In the case of projections having a rectangular cross section, the latching element is preferably pre-tensioned in an outward direction, for example at right angles to an edge limitation of the projection.

In a particularly preferred embodiment, the busbar adapter also comprises a touch-guard element that is preferably fastened to the lower-deck element or is firmly inserted and latched into the lower-deck element, so that it cannot be released by the user. This is also particularly important since in the busbar adapter according to the present invention it is envisaged that a user, too, removes the upper-deck element during normal operation. In this case, the touch-guard element takes care that the possibly current-carrying elements and contacts are covered such that the user cannot accidently touch them even if the upper deck is removed.

In a particular embodiment, the busbar adapter also comprises a supporting rail for fastening electrical appliances, that can be fastened on the busbar adapter in different positions. A preferred embodiment of such a supporting rail is disclosed for example in DE 202 11 940 U1 by the same applicant whose content of the disclosure is hereby completely incorporated into the present application.

BRIEF DESCRIPTION OF THE DRAWINGS

These and further features and attributes of the inventive busbar system will be even clearer with reference to the following drawings that show preferred embodiments.

DETAILED DESCRIPTION OF THE PREFERRED EMBODIMENTS

Figure 1:
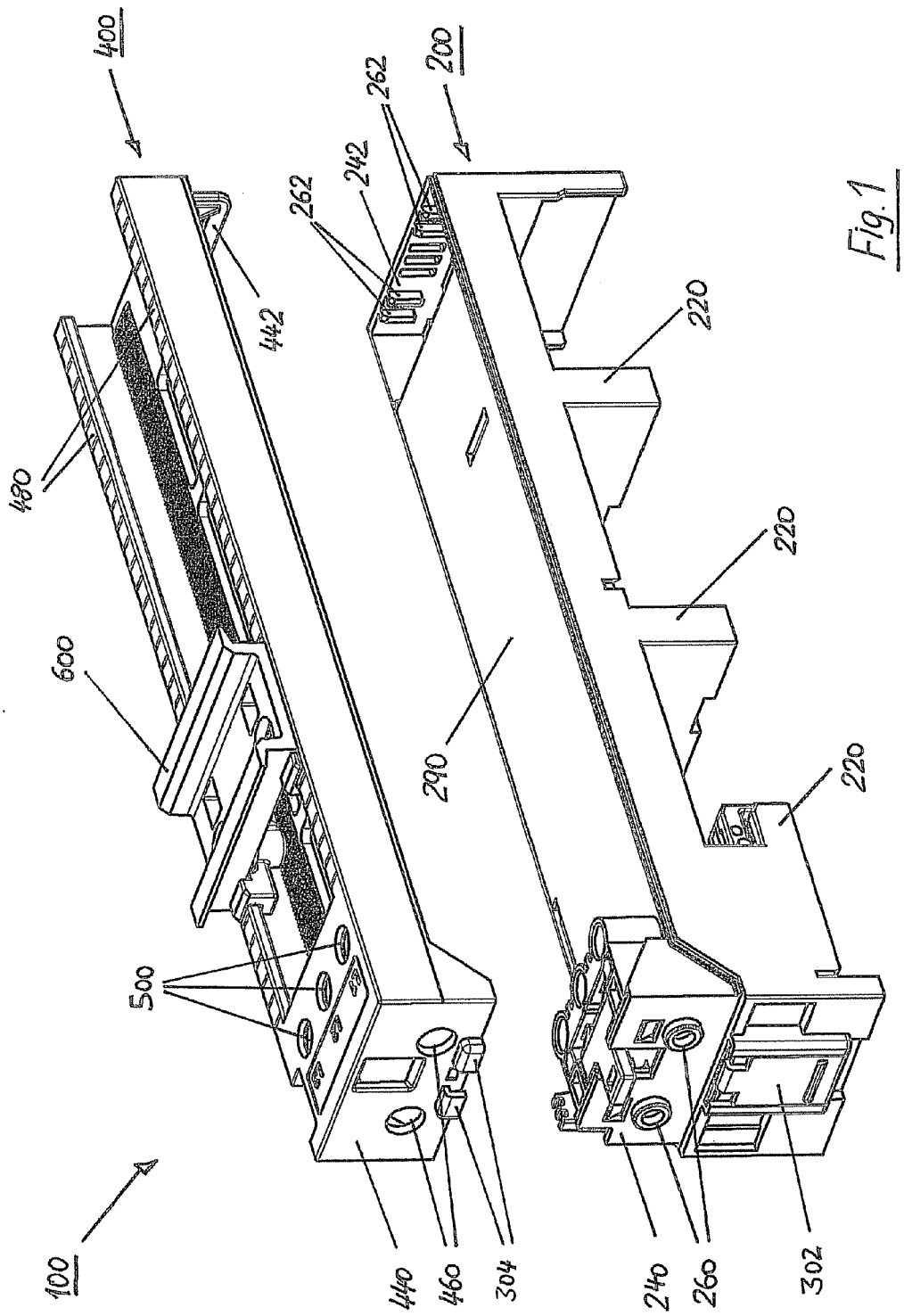
FIG. 1 shows a perspective view of an embodiment of an inventive busbar adapter, the upper-deck element and the lower-deck element not being assembled.
Figure 2:
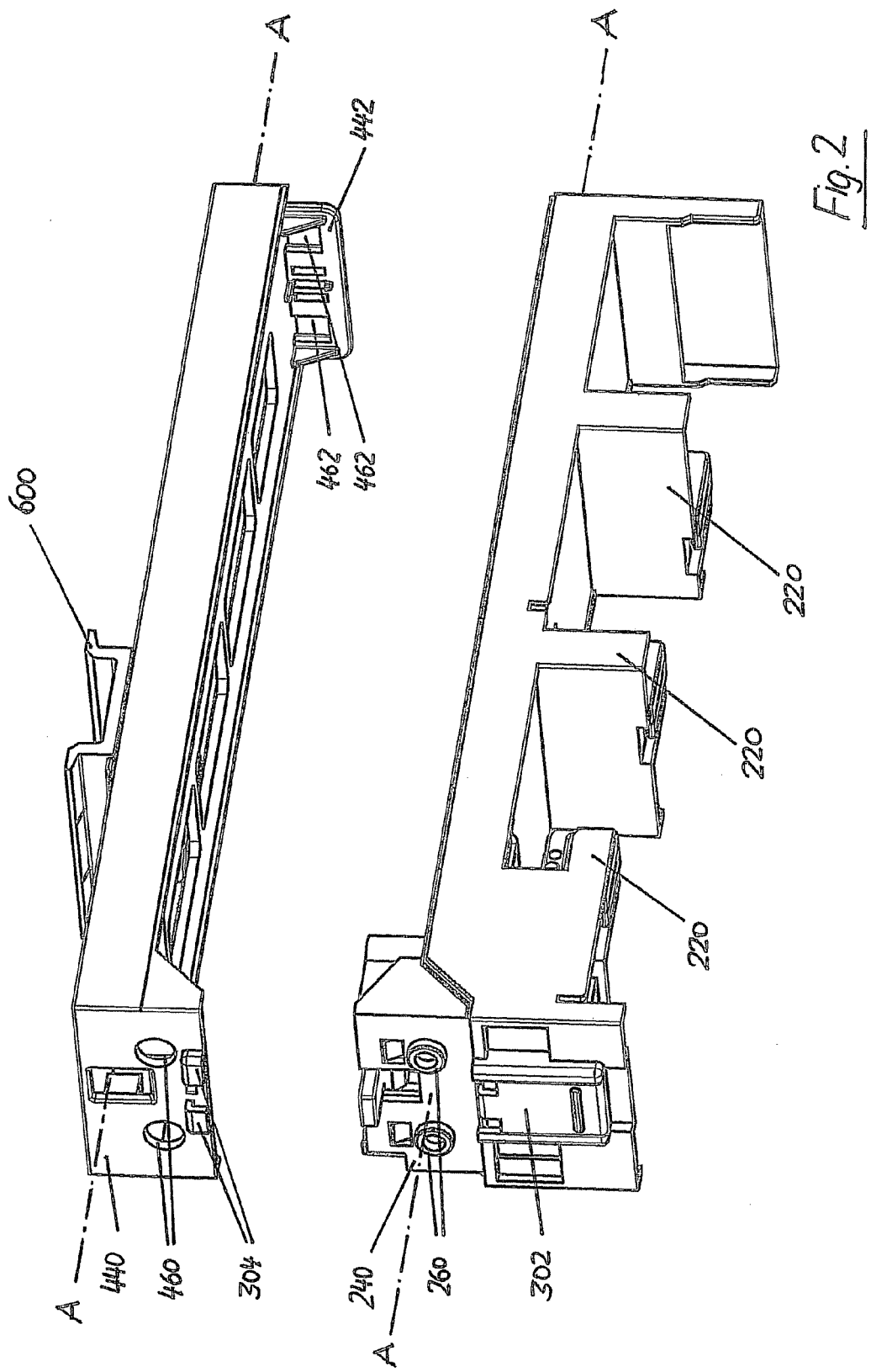
FIG. 2 shows the embodiment illustrated in FIG. 1 from a slightly different perspective.

FIGS. 1 and 2 show an embodiment of a busbar adapter 100 having a lower-deck element 200 and an upper-deck element 400, the two deck elements 200, 400 being releasably interconnectable and being illustrated in FIGS. 1 and 2 in an unconnected representation.

The lower-deck element 200 comprises fastening elements 220 for fastening the busbar adapter 100 to busbars, the busbar adapter 100 illustrated in the figures being an adapter for a 3-pole system, so that a total of 3 fastening elements 220 are provided for fastening to a total of 3 busbars.

The upper-deck element 400 comprises supporting webs 480 extending in the longitudinal direction, i.e. parallel to its longitudinal axis A (see FIG. 2), on which a supporting rail 600 is fastened that can be attached at a different position to the upper-deck element 400 and serves to receive electrical appliances, in particular electrical installation appliances, such as for example switch-fuse units.

FIGS. 1 and 2 also illustrate well the access for three terminals 500, since this is the case of a 3-pole busbar adapter 100. Details of these terminals are not illustrated since they are of no importance for understanding the present invention.

The lower-deck element 200 comprises at its longitudinal ends in each case an end wall 240, 242 that extend essentially in a plane at right angles to the longitudinal axis (see FIG. 2), each of the end walls 240, 242 being provided with two projections 260, 262. The projections 260 on the end wall 240 are of annular design, having a circular cross section in this embodiment, while the projections 262 consist of two part projections between which a recess or a gap is provided. Such a design of the projections 260, 262 on the one hand provides for safe positioning and fastening, while on the other hand weight is saved.

At its longitudinal ends, the upper-deck element 400 comprises in each case an end wall 440, 442 that extend essentially in a plane at right angles to the longitudinal axis A (see FIG. 2), each end wall 440, 442 being provided with two openings 460, 462. The openings 460 are designed as openings having a circular cross section, while the openings 462 exhibit a rectangular cross section, in this embodiment an almost square cross section.

The inside dimensions of the openings 460, 462 are therefore designed so as to match the outside dimensions of the projections 260, 262, so that safe positioning of the upper-deck element 400 on the lower-deck element 200 is safeguarded.

The illustrated embodiment of the busbar adapter 100 further comprises a locking element 300 that comprises a locking slider 302 and a locking receptacle 304. In this embodiment, the locking slider 302 is arranged at an end wall 240 of the lower-deck element 200, while the locking receptacle 304 is provided on an end wall 440 of the upper-deck element 400. The locking receptacle 304 consists of two part elements. The mode of operation of the locking element 300 is made clear in particular with reference to FIGS. 3 and 4 which will be treated below.

Figure 3:
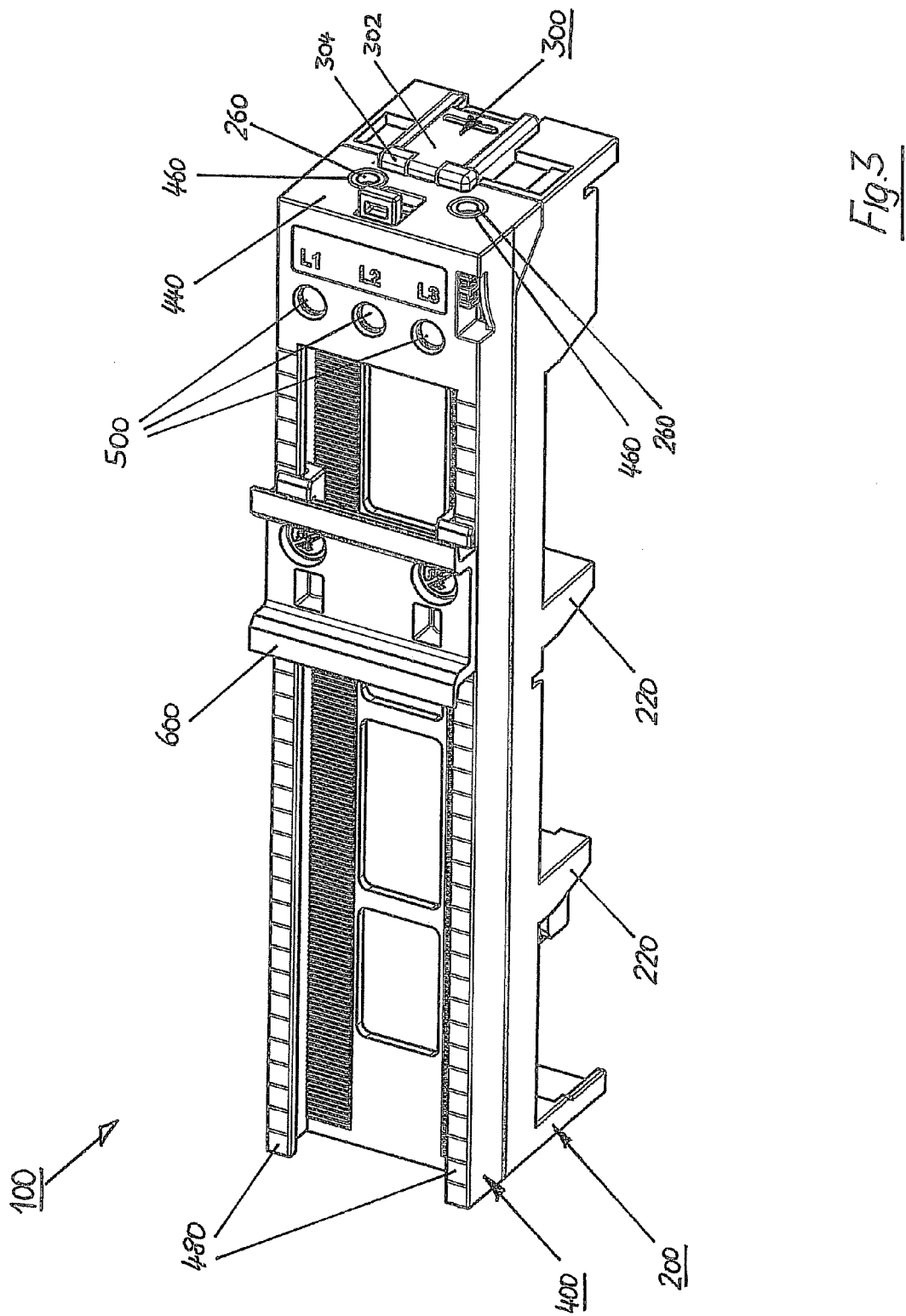
FIG. 3 shows a perspective illustration of the embodiment, shown in FIGS. 1 and 2, of the busbar adapter, the busbar adapter being in its operating position.
Figure 4:
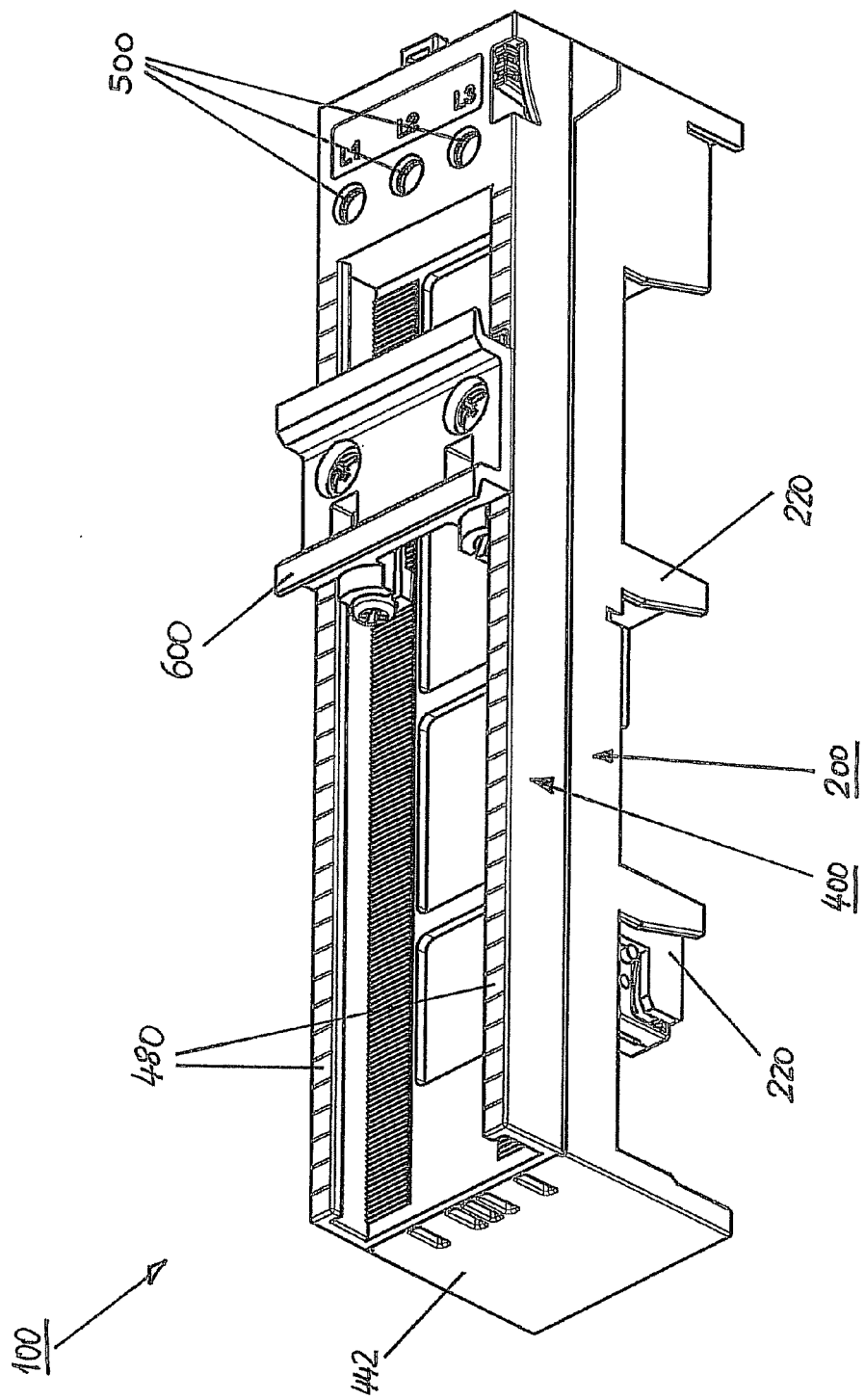
FIG. 4 shows the embodiment, illustrated in FIG. 3, from a slightly different perspective.

FIGS. 3 and 4 show the embodiment, illustrated in FIGS. 1 and 2, of the busbar adapter 100 in its operating position in which the upper-deck element 400 is fastened to the lower-deck element 200. In view of the individual elements, reference is made to the description for FIGS. 1 and 2 in order to avoid repetitions.

As is clearly visible in FIGS. 3 and 4, the projections 260 of the lower-deck element 200 extend into the associated openings 460 of the upper-deck element 400 (see FIG. 3), while the projections 262 of the lower-deck element 200 extend into the associated openings 462 of the upper-deck element 400 (see FIG. 4).

In this embodiment, the projections 260 of the lower-deck element 200 protrude slightly beyond the plane of the end wall 440 of the upper-deck element 400, by about 0.5 mm in the embodiment illustrated here, so that the user can determine even by touching whether the projections 260 protrude safely into the and through the associated openings 460.

In FIG. 3, it is in particular also the function of the locking element 300 that is clearly visible: The locking slider 302 on which the lower-deck element 200 is situated has been pushed into its locking position so that parts of the locking lever 302 extend into the area of the upper-deck element and between the two elements of the locking receptacle 304. This results in the situation that the upper-deck element 400 cannot be shifted parallel to the longitudinal axis A (toward the right in FIG. 3), so that it is also not possible to detach the upper-deck element 400 from the lower-deck element 200.

Figure 5:
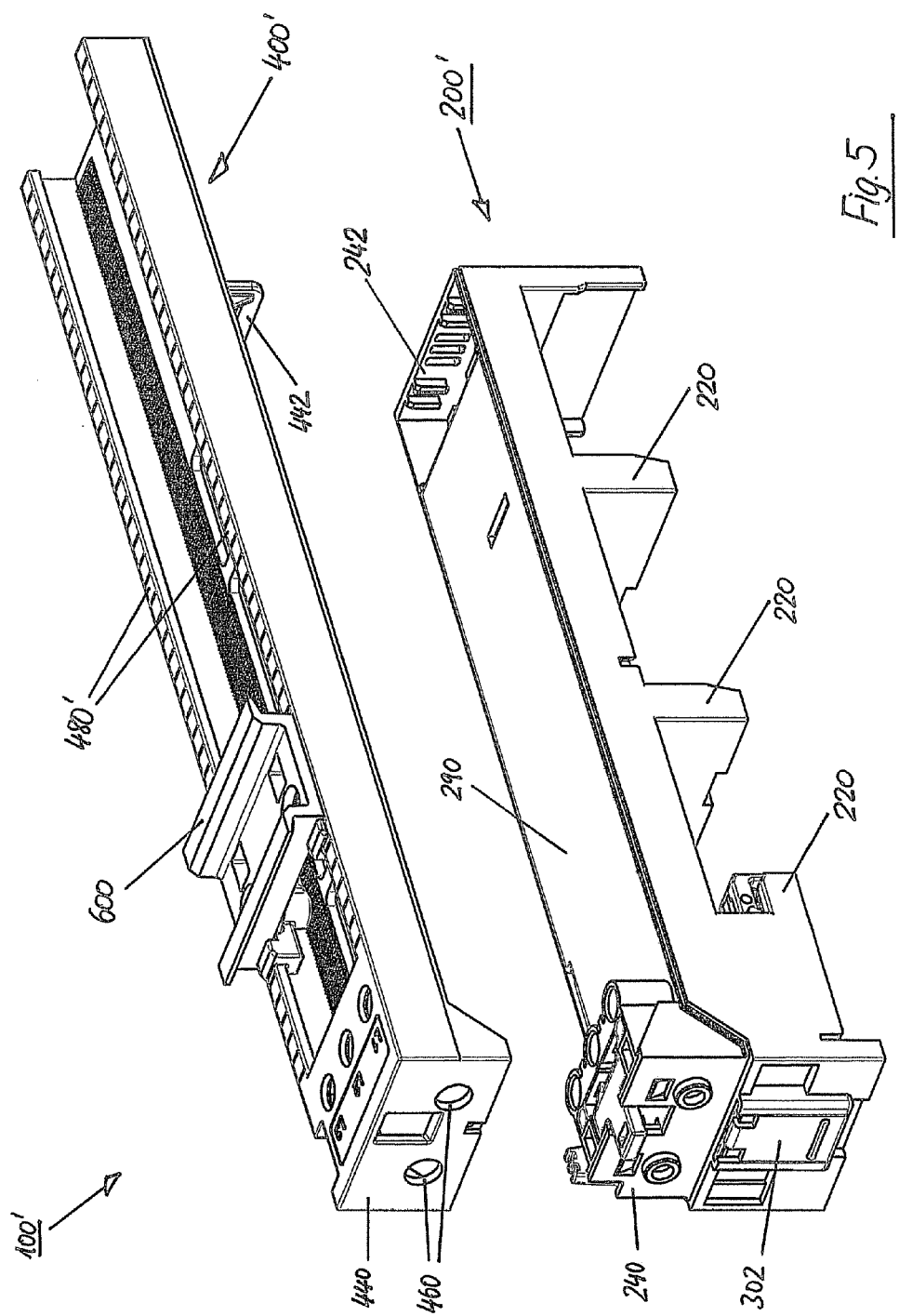
FIG. 5 shows a perspective view of a further embodiment of an inventive busbar adapter, the upper-deck element and the lower-deck element not being assembled.

FIG. 5 shows a further embodiment of a busbar adapter 100' having a lower-deck element 200' and an upper-deck element 400'. With the exception of the upper-deck element 400', the elements are largely identical to the elements of the embodiment illustrated in FIG. 1, so that reference is made to the description for FIG. 1 to avoid repetitions. Similar or identical elements have been provided with identical reference characters.

In contrast to the embodiment illustrated in FIG. 1, the embodiment illustrated in FIG. 5 shows an extended upper-deck element 400, so that the holding webs 480', too, are longer so that it is possible to mount more electrical appliances on the supporting webs 480'.

It has to be noted in this regard that the end walls 440, 442 of the upper-deck element 400' are identical to the end walls illustrated in FIG. 1, they are in particular arranged at the same positions, so that even this extended upper-deck element 400' can be placed on a lower-deck element 200' or a lower-deck element 200, as it is illustrated in FIG. 1. It is only the supporting webs 480' and the associated connecting arc that project beyond the end wall 442.

Using such an embodiment it is possible to provide more space for electrical appliances, however without having to carry out changes to the lower-deck element 200, 200', thus enabling a particular flexibility.

FIGS. 6 to 9 show a further embodiment of an inventive busbar adapter, identical or similar elements having been provided with identical reference characters.

The busbar adapter illustrated in FIGS. 6 to 9 is very similar to the previous embodiments, however the front side 440 of the upper-deck element 400" is arranged slightly offset in its longitudinal direction. The front side 440 likewise comprises two openings 460, see FIG. 6, into which associated projections 260 engage that are arranged on a front side 240 of the lower-deck element 200', see FIG. 7.

Figure 6:
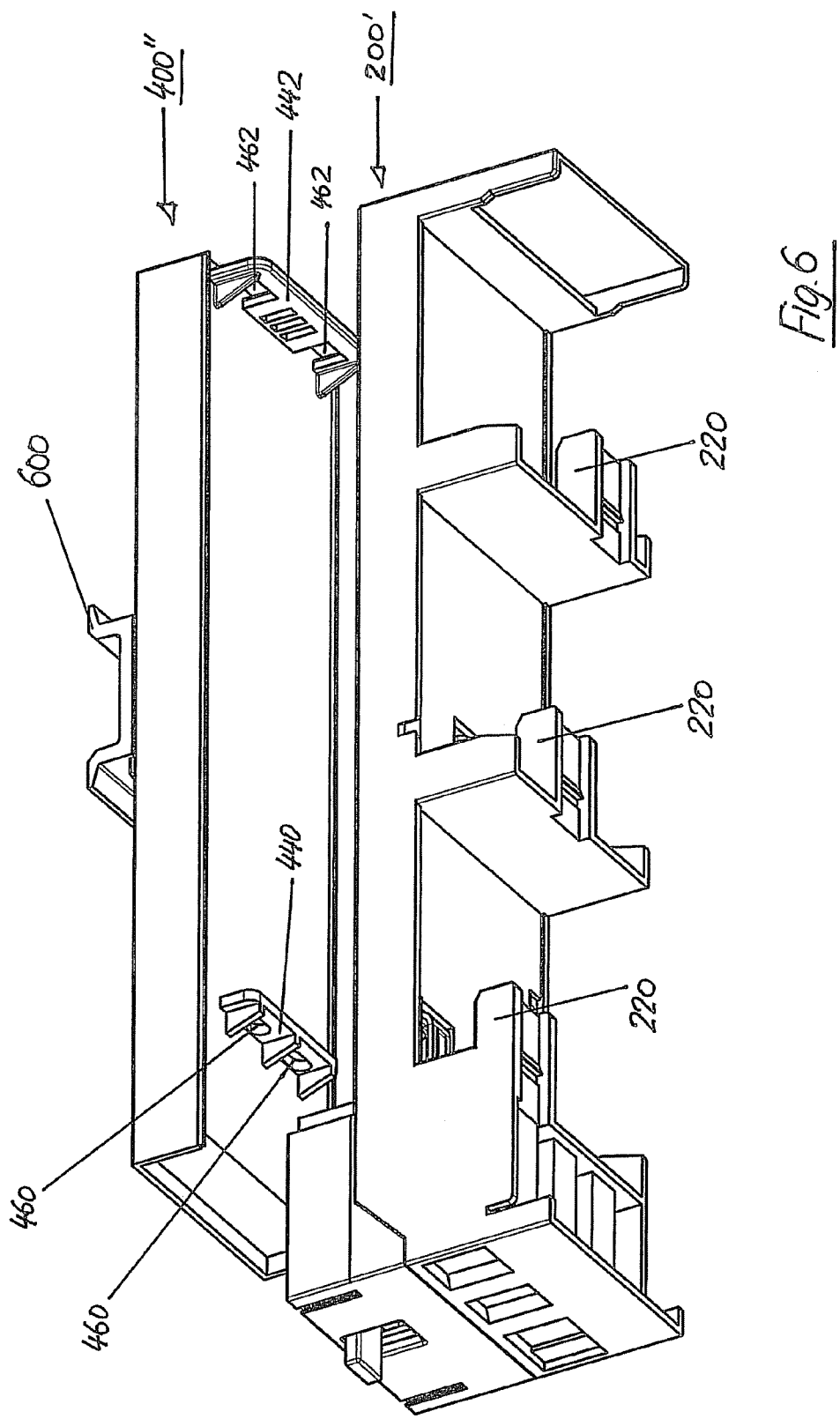
FIG. 6 shows a perspective view of a further embodiment of an inventive busbar adapter, the upper-deck element and the lower-deck element not being assembled.
Figure 7:
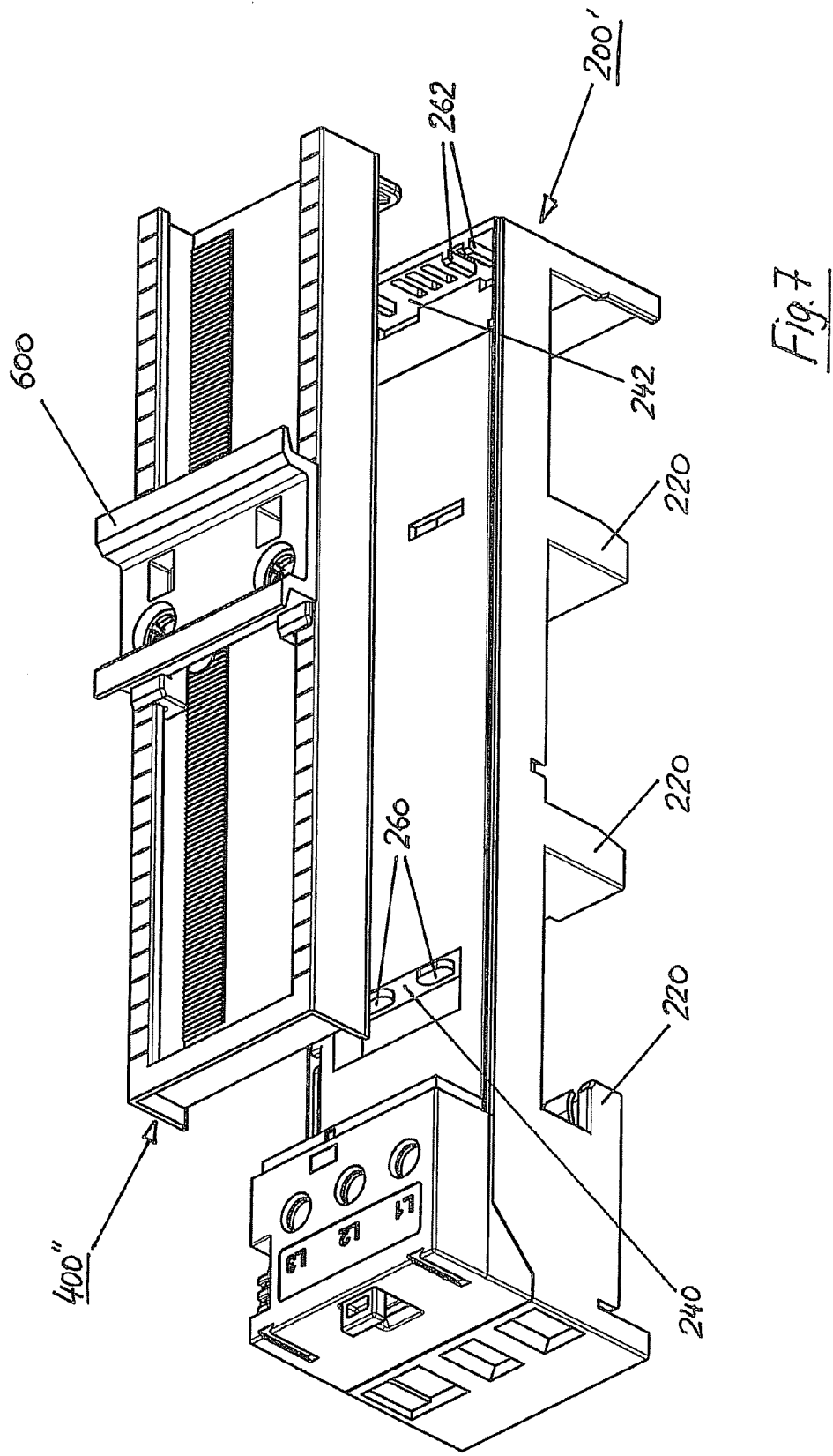
FIG. 7 shows the embodiment, illustrated in FIG. 6, from a slightly different perspective.

In view of the second front side 442 having openings 462 of the upper-deck element 400", see FIG. 6, and the projections 262 of the front side 242 of the lower-deck element 200', see FIG. 7, reference is made in particular to the description for the FIGS. 1 and 2 to avoid repetitions.

Such an embodiment exhibits in particular the advantage that in a front area of the busbar adapter, an area in which also the terminals for the lines are situated (in the left area in FIGS. 6 to 9), additional electronics can be accommodated, for example also LED lamps that indicate a state of the busbar adapter.

Figure 8:
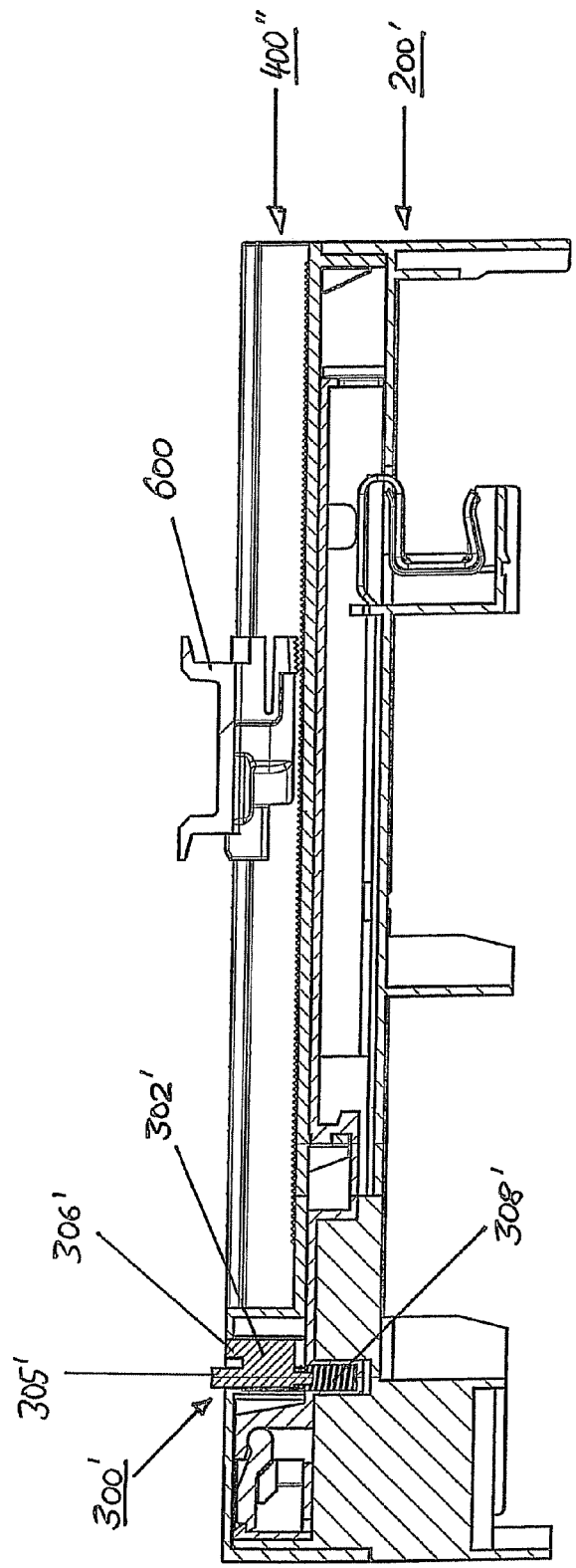
FIG. 8 shows a cross section through the embodiment illustrated in FIGS. 6 and 7, the upper-deck element and the lower-deck element being assembled and the busbar adapter being locked.
Figure 9:
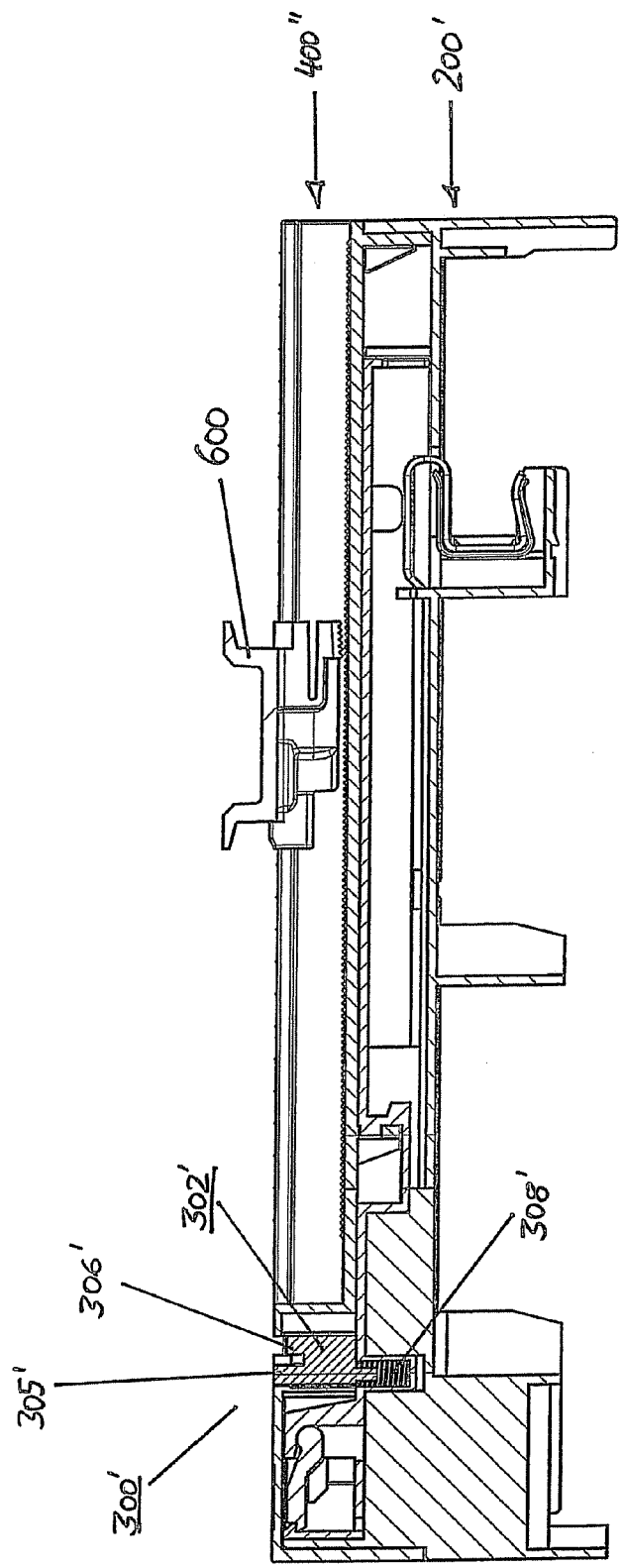
FIG. 9 shows the cross section, illustrated in FIG. 8, of the embodiment, the busbar adapter however being unlocked.

FIGS. 8 and 9 show the busbar adapter 100 in a state in which the upper-deck element 400" is fastened on top of the lower-deck element 200'.

In FIGS. 8 and 9 it is in particular the locking device 300' that is clearly visible that in its locking position prevents the upper-deck element 400" from shifting relative to the lower-deck element 200' in a direction parallel or anti-parallel to the longitudinal axis of the lower-deck element 200'.

The locking device 300' comprises a locking slider 302' that is attached to the lower-deck element 200' and is biased in a locking position by means of a spring device 308'.

As can be clearly seen in particular in FIG. 8, in which the locking slider 302' is located in its upper position, that is in the locking position, a projection 306' of the locking slider 302' is located in front of an edge of the upper-deck element 400" such that shifting the upper-deck element 400" in a direction parallel or anti-parallel to the longitudinal axis of the lower-deck element 200', toward the left in FIG. 8, is reliably prevented, so that the upper-deck element 400" cannot be detached from the lower-deck element 200'.

FIG. 9 shows the embodiment illustrated in FIG. 8, in which however the locking device 300' is situated in its unlocked position, which can be achieved in that a user presses a projection 305' in the direction of the lower-deck element 200', downward in FIGS. 8 and 9, so that the locking slider 302' is pressed in the direction of the lower-deck element 200' counter to the spring tension of the spring element 308', so that the projection 306' is likewise moved downward, so that an edge of the upper-deck element 400" can now be moved in the direction toward the longitudinal axis of the lower-deck element, toward the left in FIGS. 8 and 9, so that the upper-deck element 400" can be detached from the lower-deck element 200'.

The features of the invention, that have been disclosed in the description, the claims and the drawings, may be essential for the realization both individually and also in any combinations.

What is claimed is:

1. A busbar adapter comprising:
    a lower-deck element with a lower side having at least one fastening element for fastening the busbar adapter to one or more busbars, and
    an upper-deck element for fastening electrical appliances, that can be releasably connected to the lower-deck element,
    characterized in that
    one of the upper-deck element and the lower-deck element, has an end wall having at least one opening and the other of the upper-deck element and the lower-deck element has an end wall having at least one projection,
    the lower-deck element and the upper-deck element arranged such that the upper-deck element can be placed onto the lower-deck element in a motion direction relative to the lower-deck element, so that the upper-deck element can be brought into an operating position, this relative motion direction comprising at least one motion component being one of parallel and anti-parallel to a longitudinal axis of the lower-deck element, so that in the operating position of the busbar adapter the at least one projection protrudes at least partly into the at least one opening, and
    the busbar adapter further comprising a locking device with a locking position that prevents the upper-deck element from shifting relative to the lower-deck element in one of a direction parallel and anti-parallel to the longitudinal axis of the lower-deck element.

2. The busbar adapter according to claim 1, wherein the one of the upper-deck element and the lower-deck element comprises two openings in two end walls and the other of the upper-deck element and the lower-deck element comprises two projections on two end walls.

3. The busbar adapter according to claim 1, wherein the at least one projection comprises two part projections between which a recess is provided.

4. The busbar adapter according to claim 1, wherein the at least one projection is ring-shaped.

5. The busbar adapter according to claim 1, wherein the at least one projection protrudes through said at least one opening in the operating position of the busbar adapter.

6. The busbar adapter according to claim 1, wherein the at least one opening is exclusively provided on the end wall of one of the upper-deck element and the lower-deck element and the at least one projection is exclusively provided on the end wall of the other of the upper-deck element and the lower-deck element.

7. The busbar adapter according to claim 1, wherein the at least one opening is located in the upper-deck element and the at least one projection is located in the lower-deck element.

8. The busbar adapter according to claim 1, further comprising a locking device having a locking and at least one locking receptacle into which the locking slider engages at least partly when the locking slider is in a locking position and the busbar adapter is in the operating position.

9. The busbar adapter according to claim 8, wherein the locking slider is situated on the outside of an end wall of the lower-deck element, whereas the at least one locking receptacle is located on an end wall of the upper-deck element.

10. The busbar adapter according to claim 1, further comprising a locking 5 device with a locking slider that is arranged on the lower-deck element and can be moved between a locking position and an unlocking position, the locking device further comprising a spring device that pretensions the locking slider in the locking position.

11. The busbar adapter according to claim 1 further comprising a latching element at the at least one projection.

12. The busbar adapter according to claim 1, wherein the lower-deck element further comprises a touch-guard element to guaranty a touch protection when the upper-deck element is detached from the lower-deck element.

13. The busbar adapter according to claim 12, wherein the touch-guard element is firmly connected to the lower-deck element.

14. The busbar adapter according to claim 1, further comprising at least one supporting rail for fastening electrical appliances, the at least one supporting rail capable of being fastened in different positions on the upper-deck element of the busbar adapter.

* * * * *